(12) United States Patent
Long et al.

(10) Patent No.: US 12,296,297 B2
(45) Date of Patent: May 13, 2025

(54) METHOD FOR TREATING WASTE GASES CONTAINING LOW-CONCENTRATION VOLATILE ORGANIC COMPOUNDS (VOCs) BASED ON COMBINATION OF ADSORPTION AND IN-SITU TEMPERATURE-VARYING CATALYTIC OZONATION

(71) Applicants: Nanjing University, Nanjing (CN); Quanzhou Institute for Environmental Protection Industry, Nanjing University, Quanzhou (CN)

(72) Inventors: Chao Long, Nanjing (CN); Bowen Xu, Nanjing (CN); Jian Zhang, Nanjing (CN); Qi Shao, Nanjing (CN); Lisha Wang, Nanjing (CN); Dabo Hu, Nanjing (CN)

(73) Assignees: Nanjing University, Nanjing (CN); Quanzhou Institute for Environmental Protection Industry, Nanjing University, Quanzhou (CN)

( * ) Notice: Subject to any disclaimer, the term of this patent is extended or adjusted under 35 U.S.C. 154(b) by 423 days.

(21) Appl. No.: 17/955,886

(22) Filed: Sep. 29, 2022

(65) Prior Publication Data
US 2023/0023594 A1 Jan. 26, 2023

(51) Int. Cl.
*B01D 53/04* (2006.01)
*B01D 53/76* (2006.01)
*B01D 53/86* (2006.01)

(52) U.S. Cl.
CPC ......... *B01D 53/76* (2013.01); *B01D 53/0438* (2013.01); *B01D 53/8687* (2013.01); *B01D 2258/06* (2013.01)

(58) Field of Classification Search
CPC ............... B01D 53/76; B01D 53/0438; B01D 53/8687; B01D 2258/06; B01D 53/04; B01D 2255/50; B01D 53/346; B01D 2251/104; B01D 2257/7027; B01D 2257/708; B01D 2259/4009; B01D 53/8696; B01D 53/96; B01D 53/0446; Y02A 50/20
USPC ............ 95/8, 11, 14, 141, 148; 96/109, 111, 96/112, 143, 144, 146
See application file for complete search history.

(56) References Cited

U.S. PATENT DOCUMENTS

2010/0254868 A1* 10/2010 Obee ........................ C02F 1/78
  210/744
2023/0294034 A1* 9/2023 Shi ..................... B01D 53/0438
  431/13

FOREIGN PATENT DOCUMENTS

| CN | 104492255 A | 4/2015 |
| CN | 107158909 A | 9/2017 |
| CN | 108079780 A | 5/2018 |
| CN | 108096994 A | 6/2018 |
| CN | 211988018 U | 11/2020 |

(Continued)

*Primary Examiner* — Frank M Lawrence, Jr.

(57) ABSTRACT

A method for treating waste gases containing low-concentration volatile organic compounds (VOCs) based on combination of adsorption and in-situ temperature-varying catalytic ozonation, relating to treatment of organic waste gases. In the method, a VOCs-containing waste gas is fed to an adsorption bed for enrichment, which includes a low-temperature regeneration process and a high-temperature regeneration process. A catalyst with high adsorption capacity and catalytic activity is loaded on the adsorption bed.

11 Claims, 2 Drawing Sheets

(56) References Cited

FOREIGN PATENT DOCUMENTS

| CN | 112827505 A | 5/2021 |
| CN | 113145161 A | 7/2021 |

* cited by examiner

METHOD FOR TREATING WASTE GASES CONTAINING LOW-CONCENTRATION VOLATILE ORGANIC COMPOUNDS (VOCs) BASED ON COMBINATION OF ADSORPTION AND IN-SITU TEMPERATURE-VARYING CATALYTIC OZONATION

CROSS-REFERENCE TO RELATED APPLICATIONS

This application claims the benefit of priority from Chinese Patent Application No. 202110670919.1, filed on Jun. 17, 2021. The content of the aforementioned application, including any intervening amendments thereto, is incorporated herein by reference in its entirety.

TECHNICAL FIELD

This application relates to organic waste gas treatment, and more particularly to a method for treating waste gases containing low-concentration volatile organic compounds (VOCs) based on combination of adsorption and in-situ temperature-varying catalytic ozonation.

BACKGROUND

Industrial waste gas is one of the main sources of atmospheric pollutants, in which volatile organic compounds (VOCs) pose great threat to human health and environment. VOCs mainly cause damages to the respiratory system and nervous system after entering the human body, and will undergo chemical reactions to form various secondary pollutants after released to the atmosphere. The organic aerosol formed from the oxidation of VOCs is an important component of $PM_{2.5}$. Meanwhile, VOCs are the leading cause of holes in the ozone layer and photochemical smog. In the past few decades, the VOCs emission in China is growing increasingly, accompanied by more strict emission standards.

At present, the large-air-volume waste gas with low concentration of VOCs is treated mainly by bio-degradation, chemical degradation, and adsorption. The bio-degradation method has advantages of low cost and less secondary pollution, but it is limited by narrow applicable concentration range and poor volatility resistance. Regarding the chemical degradation method, the VOCs can be completely removed, but this process struggles with high energy consumption and material consumption. The adsorption strategy is appreciated by high removal efficiency and low operating cost, but it requires disposal of solid wastes or recovery of the adsorbent by desorption and regeneration. The adsorbent regeneration commonly involves the thermal desorption process, and the desorbed high-concentration VOCs are treated by subsequent processes. Therefore, the regeneration process actually has high energy consumption, and may cause secondary pollution. In view of this, a monolithic catalyst having dual functions of adsorption and catalytic ozonation for VOCs is designed, and by means of the monolithic catalyst, an adsorption-in-situ temperature-varying catalytic ozonation process is developed, which is low in energy consumption and material consumption, and free of generation of solid wastes or secondary pollution.

Currently, the ozonation treatment for VOCs generally includes periodic adsorption and catalysis procedures, and at least two adsorption beds are required to work alternately to achieve the continuous treatment of continuous-flow waste gases (as published by Chinese patent application publications No. 104492255A, No. 107158909A and No. 108096994A, and Chinese patent No. 211988018U). Chinese patent publication No. 108079780A discloses a two-stage process, where enrichment, adsorption and desorption after saturation are carried out in the first stage, and ozonation is performed in the second stage. Nevertheless, these dual-tower or dual-bed designs generally has large space occupation, high construction cost, and complicated operation. Moreover, similar to the catalytic combustion, a single-bed process is designed, where ozone is mixed with the waste gas and then fed to the catalyst bed. However, the single-bed process is susceptible to temperature. Specifically, under low-temperature conditions, this process has low $CO_2$ selectivity and high production of by-products, and suffers rapid catalyst deactivation, and insufficient reaction between low-concentration VOCs and diluted ozone; and under high-temperature conditions, this process has high energy consumption and material consumption, and suffers large ozone loss due to the rapid ozone self-decomposition. In addition, as it is hard to match the ozone concentration with the varying VOCs concentrations, the concentrations of VOCs and ozone in the tail gas fluctuate significantly, and thus it is easy to exceed the emission standard.

SUMMARY

Through the temperature-varying design of the adsorption bed and in-situ regeneration of the adsorption bed via pulsed ozone feeding, this application achieves the continuous and efficient treatment for low-concentration organic waste gases by using a single adsorption bed, significantly improving the treatment efficiency, stability and energy consumption compared with the existing technologies.

Technical solutions of this application are described as follows.

In a first aspect, this application provides a method for a volatile organic compounds (VOCs)—containing waste gas, comprising;

(S1) feeding the VOCs-containing waste gas to an adsorption bed for enrichment;

(S2) when a VOC monitor arranged near an outlet of the adsorption bed detects VOCs, continuously feeding the VOCs-containing waste gas to the adsorption bed; and performing a primary in-situ regeneration; and (S3) when an ozone monitor arranged near an outlet of the adsorption bed detects ozone, performing a secondary in-situ regeneration; and (S4) repeating steps (S1)-(S3) to complete treatment of the VOCs-containing waste gas;

wherein the primary in-situ regeneration is performed through a step of:

(a) turning on an ozone generator; and feeding ozone-containing oxygen to the adsorption bed to be mixed with the VOCs-containing waste gas for simultaneous adsorption and catalytic ozonation;

the secondary in-situ regeneration is performed through steps of:

(A) turning on a gas heating device to heat the VOCs-containing waste gas, so as to heat the adsorption bed to 70-90° C.;

(B) after a concentration of $CO_2$ in a tail gas is stable, turning off the ozone generator;

(C) turning off the gas heating device to allow the adsorption bed to be cooled.

In some embodiments, in the primary in-situ regeneration, a temperature of the adsorption bed is controlled to be 20-50° C.

In some embodiments, a concentration of the VOCs in the VOCs-containing waste gas is lower than 500 mg/m$^3$.

In some embodiments, a concentration of the VOCs in the VOCs-containing waste gas is 30-300 mg/m$^3$.

In some embodiments, a gaseous hourly space velocity of the adsorption bed is 10000-200000 h$^{-1}$.

In some embodiments, in step (S2), when a VOC concentration detected by the VOC monitor is larger than or equal to 10% of an initial VOC concentration in the VOCs-containing waste gas, the waste gas is continuously fed to the adsorption bed, and the primary in-situ regeneration is performed.

In some embodiments, in step (a), an ozone concentration at an outlet of the ozone generator is 4000-35000 mg/m$^3$; a volume ratio of the ozone-containing oxygen to the VOCs-containing waste gas is 1:(10-50); and a gas outputted from the ozone generator is a mixture of ozone and oxygen.

In some embodiments, the VOC monitor and the ozone monitor are arranged at a position which is away from the outlet of the adsorption bed at a distance of 1/5-1/3 of a length of the adsorption bed.

In some embodiments, in step (S3), when an ozone concentration detected by the ozone monitor is larger than or equal to 1 mg/m$^3$, the secondary in-situ regeneration is performed.

In some embodiments, in step (B), when a concentration change of $CO_2$ is less than 10% within 3-10 min, the concentration of $CO_2$ in the tail gas is considered to be stable.

In some embodiments, the adsorption bed is filled with a catalyst; and the catalyst is prepared with reference to Chinese patent application No. 202011621185.X.

In some embodiments, the catalyst comprises an inorganic ceramic matrix and a molecular sieve coating; the molecular sieve coating is loaded on the inorganic ceramic matrix; the inorganic ceramic matrix has a specific surface area of 5-150 m$^2$/g; the molecular sieve coating has a specific surface area of 300-800 m$^2$/g; a silicon-to-aluminum ratio of the molecular sieve coating is not less than 3; the molecular sieve coating is loaded with a metal oxide; the metal oxide is 0-10% by weight of the molecular sieve coating; and both the molecular sieve coating and the inorganic ceramic matrix is coated with colloidal silica.

In some embodiments, the metal oxide comprises one or two of $MnO_x$, $CoO_x$, $CuO_x$, $CeO_x$, and $FeO_x$.

In some embodiments, the catalyst contains 1-10% by weight of metal.

In some embodiments, the catalyst is prepared through steps of:

performing a primary dealumination on a Y zeolite with water vapor to obtain a primarily-dealuminated Y zeolite;

performing a secondary dealumination of the primarily-dealuminated Y zeolite with an acid to obtain a secondarily-dealuminated Y zeolite; and adding dropwise a metal oxide in a salt solution on the secondarily-dealuminated Y zeolite to complete a loading of the metal oxide on the Y zeolite.

In some embodiments, the method for preparing the catalyst, further comprising:
(1) Pretreatment of the Y Zeolite
  heating the Y zeolite to 200-300° C. in the air;
(2) Primary Dealumination
  feeding the water vapor to the Y zeolite followed by heating, holding and cooling; stopping feeding the water vapor, and performing natural cooling to obtain the primarily-dealuminated Y zeolite;
(3) Secondary Dealumination
  preparing an acid solution; placing the primarily-dealuminated Y zeolite in the acid solution followed by stirring, drying, and standing to obtain the secondarily-dealuminated Y zeolite; and
(4) Loading of Catalytic Components
  adding dropwise a metal salt solution on the secondarily-dealuminated Y zeolite, followed by standing, drying, and calculation to obtain the catalyst.

In some embodiments, the primary dealumination is performed through steps of:
  feeding the water vapor to the Y zeolite and heating to 650-850° C., followed by holding for 4-6 h, cooling to 200-400° C., stopping feeding of the water vapor, and cooling down to below 100° C. in the air to obtain the primarily-dealuminated Y zeolite.

In some embodiments, the secondary dealumination is performed through steps of:
  preparing a 0.5-2 mol/L nitric acid solution; mixing the primarily-dealuminated Y zeolite and the nitric acid solution in a three-necked flask according to a solid-liquid ratio of 1:(8-12), followed by reaction under stirring and reflux at 60-100° C., rinsing with water 3-5 times, drying, and standing to obtain the secondarily-dealuminated Y zeolite.

In some embodiments, the loading of catalytic components is performed through steps of:
  adding dropwise a metal salt solution to the secondarily-dealuminated Y zeolite, followed by standing at room temperature for 8-14 h, drying at 80-140° C. for 8-16 h, and calculation at 500-600° C. for 3-5 h to obtain the catalyst.

In some embodiments, the acid used in the secondary dealumination is nitric acid, oxalic acid, citric acid, hydrochloric acid or a combination thereof.

In some embodiments, the metal salt solution is selected from the group consisting of manganese acetate, manganese sulfate, manganese nitrate, manganese chloride, chromic acetate, chromic sulfate, chromic nitrate, chromic chloride, cobalt acetate, cobalt sulfate, cobalt nitrate, cobalt chloride, copper acetate, copper sulfate, copper nitrate, copper chloride, iron acetate, iron sulfate, iron nitrate, iron chloride, cerium acetate, cerium sulfate, cerium nitrate, cerium chloride, nickel acetate, nickel sulfate, nickel nitrate, nickel chloride and a combination thereof.

In a second aspect, this application provides a system for implementing the above method, comprising:
  an adsorption bed;
  wherein an inlet of the adsorption bed is provided with a first gas distribution support layer; an outlet of the adsorption bed is provided with a second gas distribution support layer; a filler is arranged between the first gas distribution support layer and the second gas distribution support layer; and an oxygen-ozone mixture feeding system is arranged between an inlet of an adsorption tower and the first gas distribution support layer; and a temperature sensor, a temperature control device, a VOC monitor, and an ozone monitor are all provided near the outlet of the adsorption bed.

The currently accepted reaction mechanisms of ozone are illustrated as follows, where * represents the catalyst surface active site:

$$O_3 + * \to O_2 + O* \quad (1);$$

$$VOCs \to VOCs_{(ads)} \quad (2);$$

$$VOCs_{(ads)} + O* \to decomposition + * \quad (3);$$

$$O* + O_3 \to O_2 + O_2* \quad (4); \text{ and}$$

$$O_2* \to O_2 + * \quad (5);$$

where formulas (1), (2), and (3) illustrate the degradation process of VOCs by ozone, and formulas (1), (4), and (5) illustrate the ozone self-degradation process. Under low-temperature conditions, formula (5) undergoes slowly due to lack of sufficient energy such that $O_2*$ is difficult to leave the oxygen vacancy in the form of oxygen molecules, which makes the reactive oxygen species tend to react with VOCs through formulas (2) and (3), that is, the catalyst has some ability to catalyze ozonation of VOCs at low temperature, but shows a low catalytic effect for ozone decomposition. Under high-temperature conditions, the reaction rate of each step increases. However, as limited by the mass transfer, surface diffusion, and adsorption of VOCs, the reaction rate of ozone and VOCs fails to increase geometrically, while formula (5) undergoes faster owing to sufficient energy such that the reaction rate gap between the degradation process of VOCs and the decomposition of ozone is reduced, that is, the catalyst is highly efficient in the catalytic ozonation of VOCs and the decomposition of ozone at high temperatures. Based on this, in this application, the de-aluminated super-stable Y-molecular sieve is used as a carrier to further reduce the usage amount of metal and improve the dispersion of metal oxides, and a temperature-varying regeneration system is designed. By using the temperature-varying regeneration system, most of ozone is used to mineralize adsorbed organic matters via a low-temperature regeneration process to reduce the ozone consumption, and then the intermediate products, by-products and unmineralized VOCs produced by the low-temperature regeneration process are completely degraded into $CO_2$ and water, and the excessive ozone is decomposed into oxygen via a high-temperature regeneration process, avoiding the ozone emission from the tail gas caused by insufficient organic matter in the late regeneration period.

The temperature-varying system provided herein prevents insufficient regeneration at low temperatures, strengthens the regeneration effect, and extends its service life. Moreover, it also avoids the waste of ozone caused by ozone self-decomposition during high-temperature regeneration. Combined with the pulsed introduction of ozone, the ozone consumption is controlled to be extremely low, which can reduce the energy consumption of the whole process system. Compared with the catalytic oxidation process with continuous feeding of ozone, the dual-bed process with periodic in-situ regeneration, and the desorption ectopic catalysis process, it shows remarkably improved performance.

Compared with the monitoring at the end of the adsorption bed, the VOC monitor and the ozone monitor arranged in the middle rear section of the adsorption bed can accurately control the process steps. The VOC monitor prevents VOCs replaced by ozone through competitive adsorption from being directly discharged from the tail gas through the saturated adsorption bed, and the ozone monitor accurately determines the regeneration situation and avoids the direct emission of excessive ozone. Therefore, the tail gas emission can always meet the standards by the combination of the VOC monitor and the ozone monitor. The beneficial effects of the present disclosure are described as follows.

In the method provided herein, a dual-function material with high adsorption capacity and catalytic ozonation of VOCs is used to perform adsorption and in-situ temperature-varying catalytic ozonation of VOCs on VOCs-containing waste gases. The adsorption process brings high VOCs removal rate, and the in-situ regeneration leads to complete degradation of VOCs. During the whole process, there are no solid wastes and secondary pollution, and it is not required to replace the adsorbent. By the pulsed ozone feeding and temperature-varying catalytic regeneration, continuous flow industrial waste gas with complex components and fluctuating concentration can be treated on a single adsorption bed, showing significantly lower energy consumption, engineering investment and operating costs than other existing processes.

BRIEF DESCRIPTION OF THE DRAWINGS

in FIG. 2: 1-1, first valve; 1-2, second valve; 2, gas heating device; 3, oxygen-ozone mixture feeding system; 4, ozone generator; 5, one-way valve; 6, filler loading and unloading port; 7, adsorption bed; 8, gas distribution support layer; 9, VOC monitor; 10, temperature sensor; 11, temperature control device; 12, ozone monitor; and 13, adsorption tower.

DETAILED DESCRIPTION OF EMBODIMENTS

The present disclosure will be described in detail below with reference to embodiments, but these embodiments are not intended to limit the present disclosure.

Example 1

Provided herein is a system for treating a waste gas containing low-concentration volatile organic compounds (VOCs).

Figure 1:
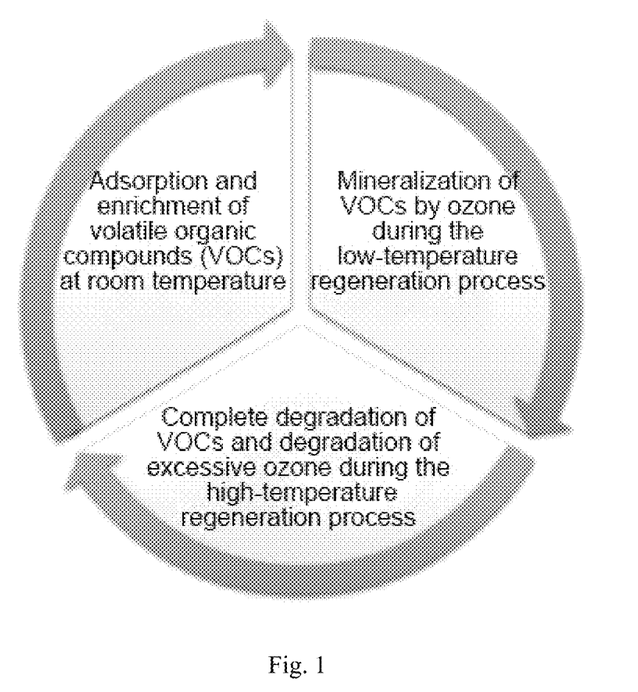
FIG. 1 is a flow chart of a method for treating a waste gas with low-concentration VOCs according to an embodiment of the present disclosure.
Figure 2:
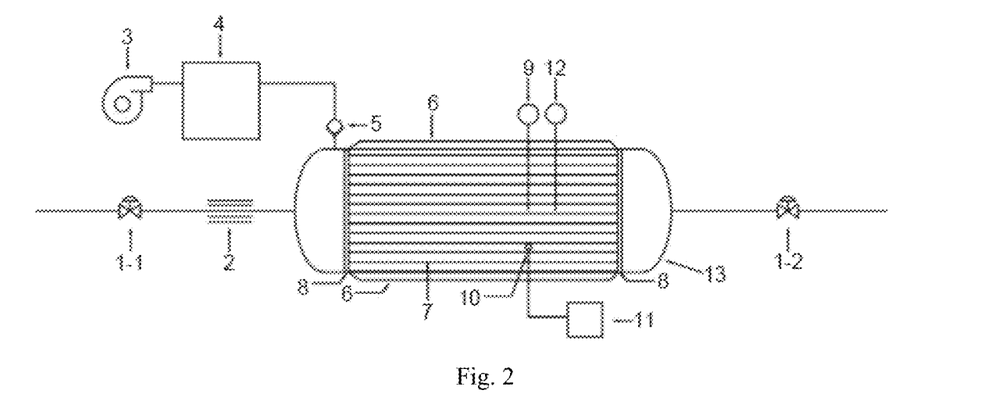
FIG. 2 structurally shows a system for treating a waste gas with low-concentration VOCs according to Example 1 of the present disclosure.
Figure 3:
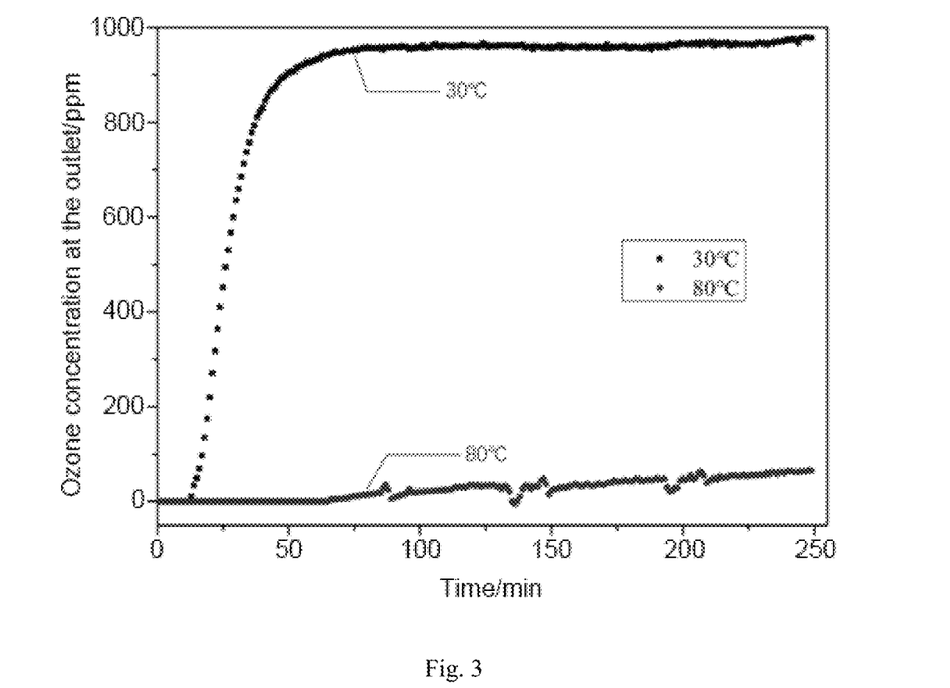
FIG. 3 shows the ability of a catalyst made in accordance with Example 3 of Chinese patent application No. 202011621185X to decompose ozone respectively at 30° C. and 80° C., where the experimental conditions are as follows: ozone concentration: 1000 ppm; oxygen concentration: 20%; nitrogen concentration: 80%; gaseous hourly space velocity: 300000 $h^{-1}$; and water bath temperature control.

As shown in FIG. 2, a first valve 1-1 and a second valve 1-2 are configured to control the system to be turned on or off. A gas heating device 2 is arranged between the first valve 1-1 and an adsorption tower 13, and close to the gas inlet pipe. The oxygen-ozone mixture feeding system 3 is connected to an ozone generator 4, and is controlled by a one-way valve 5 to be connected to the adsorption tower 13. The adsorption tower 13 is provided with an adsorption bed 7. A VOC monitor 9, an ozone monitor 12, a temperature sensor 10 are arranged near an outlet of the adsorption bed 7. The temperature sensor 10 is configured to transmit heat signals to a temperature control device 11. The temperature control device 11 is configured to control the gas heating device 2 for temperature adjustment. Two sides of the adsorption bed 7 are respectively provided with a gas distribution support layer 8, and the gas distribution support layer 8 and the adsorption tower 13 are sealed by a seal ring. The adsorption bed 7 is provided with a filler loading and unloading port 6 corresponding to the adsorption tower 13 for filling fillers.

The waste gas enters the adsorption tower 13 from the inlet pipe via the first valve 1-1 and the gas heating device 2, and successively passes through the gas distribution support layer 8, the adsorption bed 7, the VOC monitor 9, the ozone monitor 12, the temperature sensor 10, and the gas distribution support layer 8, and is then discharged from the tail gas pipe via the second valve 1-2. During the regeneration process, ozone-containing oxygen is supplied by the oxygen-ozone mixture feeding system 3 connected in series with the ozone generator 4, and is controlled by the one-way valve 5 to enter the adsorption tower 13 to be mixed with the waste gas. Then the gas mixture enters the adsorption area for the catalytic degradation of the adsorbed VOCs to allow the adsorbent to regenerate.

A method for treating a VOCs-containing waste gas by using the aforementioned system was also provided, which included the following steps.

(S1) A waste gas containing 100 mg/m$^3$ of toluene was fed to the adsorption bed that is filled with 10 kg catalyst for adsorption with a gaseous hourly space velocity of 20000 h$^{-1}$. After the adsorption, a tail gas contained 2 mg/m$^3$ of toluene, and the adsorption efficiency reached 98%.

(S2) After 15 h of the adsorption, the VOC monitor 9 detected 10 mg/m$^3$ of toluene, and then the low-temperature regeneration was performed, where the VOC monitor 9 was arranged at a position which is away from the outlet of the adsorption bed at a distance of ⅓ of a length of the adsorption bed.

(S3) The ozone generator 4 and the oxygen-ozone mixture feeding system 3 were switched on, and oxygen containing 30 g/m$^3$ of ozone was fed to the waste gas through the one-way valve 5, where a measured flow rate was 1/11 of the flow rate of the waste gas. The catalytic ozonation was performed at 29° C., and the temperature was monitored by the temperature sensor. The enriched VOCs in the adsorption bed underwent ozonation.

(S4) After 5 h of the low-temperature regeneration, the ozone concentration was detected to be 1 mg/m$^3$ by the ozone monitor 12 arranged near an outlet of the adsorption bed, and then the high-temperature regeneration was performed.

(S5) The gas heating device 2 was switched on to increase the temperature of the waste gas to heat the adsorption bed to 80° C. under the monitoring of the temperature sensor 10. The remaining toluene and the intermediate products produced during the low-temperature regeneration (such as phenol, benzyl alcohol, benzoic acid, and straight chain hydrocarbons) were completely degraded to $CO_2$ and water, and the adsorption bed was fully regenerated.

(S6) When the concentration of $CO_2$ in the tail gas was basically stable (that is, the concentration change of $CO_2$ was less than 10% within 5 min), the ozone generator 4 and the oxygen-ozone mixture feeding system 3 were turned off, the one-way valve 5 was automatically closed, and the waste gas was always kept feeding.

(S7) The gas heating device 2 was turned off, and the adsorption bed was cooled to room temperature.

Steps (S1)-(S7) were repeated.

The catalyst used in herein was prepared with reference to the Example 3 in Chinese patent application No. 202011621185X.

In this embodiment, the content of each substance in the tail gas was measured in real time by using an autosampler and gas chromatography detection system during use, and the total selectivity of CO and $CO_2$ was measured to be 95.5%. Toluene in the tail gas was maintained at the emission standard.

The steps (S1)-(S7) were repeated for ten cycles, and the adsorption penetration was reduced by 4%.

Example 2

Provided herein was a method for treating a VOCs-containing waste gas by using the system of Example 1, which was specifically described below.

(S1) A waste gas containing 200 mg/m$^3$ of toluene was fed to the adsorption bed that is filled with 10 kg catalyst for adsorption with a gaseous hourly space velocity of 20000 h$^{-1}$. After the adsorption, a tail gas contained 5 mg/m$^3$ of toluene, and the adsorption efficiency reached 97.5%.

(S2) After 9 h of the adsorption, the VOC monitor 9 detected 20 mg/m$^3$ of toluene, and then the low-temperature regeneration was performed, where the VOC monitor 9 was arranged at a position which is away from the outlet of the adsorption bed at a distance of ⅓ of a length of the adsorption bed.

(S3) The ozone generator 4 and the oxygen-ozone mixture feeding system 3 were switched on, and oxygen containing 30 g/m$^3$ of ozone was fed to the waste gas through the one-way valve 5, where a measured flow rate was 1/11 of the flow rate of the waste gas. The catalytic process was performed at 27° C., and the temperature was monitored by the temperature sensor. The highly-adsorbed VOCs in the adsorption bed underwent ozonation.

(S4) After 8 h of the low-temperature regeneration, the ozone concentration was detected to be 1 mg/m$^3$ by the ozone monitor 12 arranged near an outlet of the adsorption bed, and then the high-temperature regeneration was performed.

(S5) The gas heating device 2 was switched on to increase the temperature of the waste gas to heat the adsorption bed to 70° C. under the monitoring of the temperature sensor 10. The remaining toluene and the intermediate products produced during the low-temperature regeneration (such as phenol, benzyl alcohol, benzoic acid, and straight chain hydrocarbons) were completely degraded to $CO_2$ and water, and the catalyst of the adsorption bed was fully regenerated.

(S6) When the concentration of $CO_2$ in the tail gas was basically stable (that is, the concentration change of $CO_2$ was less than 10% within 5 min), the ozone generator 4 and the oxygen-ozone mixture feeding system 3 were turned off, the one-way valve 5 was automatically closed, and the waste gas was always kept feeding.

(S7) The gas heating device 2 was turned off, and the adsorption bed was cooled to room temperature.

Steps (S1)-(S7) were repeated.

The catalyst used in herein was prepared with reference to the Example 3 in Chinese patent application No. 202011621185X.

In this embodiment, the content of each substance in the tail gas was measured in real time by using an autosampler and gas chromatography detection system during use, and the total selectivity of CO and $CO_2$ was measured to be 98%. Toluene in the tail gas was maintained at the emission standard.

The steps (S1)-(S7) were repeated for ten cycles, and the adsorption penetration was reduced by 2%.

Example 3

Provided herein was a method for treating a VOCs-containing waste gas by using the system of Example 1, which was specifically described below.

(S1) A waste gas containing 100 mg/m³ of toluene was fed to the adsorption bed that is filled with 10 kg catalyst for adsorption with a gaseous hourly space velocity of 20000 $h^{-1}$. After the adsorption, a tail gas contained 2 mg/m³ of toluene, and the adsorption efficiency reached 98%.

(S2) After 15 h of the adsorption, the VOC monitor 9 detected 10 mg/m³ of toluene, and then the low-temperature regeneration was started, where the VOC monitor 9 was arranged at ⅓ of the total length of the adsorption bed away from the outlet of the adsorption bed.

(S3) The ozone generator 4 and the oxygen-ozone mixture feeding system 3 were switched on, and oxygen containing 20 g/m³ of ozone was fed to the waste gas through the one-way valve 5, where a measured flow rate was 1/11 of the flow rate of the waste gas. The catalytic ozonation was performed at 24° C., and the temperature was monitored by the temperature sensor. The enriched VOCs in the adsorption bed were oxidized and decomposed by the ozone.

(S4) After 9 h of the low-temperature regeneration, the ozone concentration was detected to be 1 mg/m³ by the ozone monitor 12 arranged near an outlet of the adsorption bed, and then the high-temperature regeneration was performed.

(S5) The gas heating device 2 was switched on to increase the temperature of the waste gas to heat the adsorption bed to 80° C. under the monitoring of the temperature sensor 10. The remaining toluene and the intermediate products produced during the low-temperature regeneration (such as phenol, benzyl alcohol, benzoic acid, and straight chain hydrocarbons) were completely degraded to $CO_2$ and water, and the catalyst of the adsorption bed was fully regenerated.

(S6) When the concentration of $CO_2$ in the tail gas was basically stable (that is, the concentration change of $CO_2$ was less than 10% within 5 min), the ozone generator 4 and the oxygen-ozone mixture feeding system 3 were turned off, the one-way valve 5 was automatically closed, and the waste gas was always kept feeding.

(S7) The gas heating device 2 was turned off, and the adsorption bed was cooled to room temperature.

Steps (S1)-(S7) were repeated.

The catalyst used in herein was prepared with reference to the Example 3 in Chinese patent application No. 202011621185X.

In this embodiment, the content of each substance in the tail gas was measured in real time by using an autosampler and gas chromatography detection system during use, and the total selectivity of CO and $CO_2$ was measured to be 94.7%. Toluene in the tail gas was maintained at the emission standard.

The steps (S1)-(S7) were repeated for ten cycles, and the adsorption penetration was reduced by 5%.

Comparative Example 1

The method provided in this example was different from Example 1 merely in the filler of the adsorption bed.

In this example, the filler of the adsorption bed was a Y-zeolite loaded with, where the manganese oxide was loaded by the equal volume impregnation method; and the Y-zeolite was a commercial Y-zeolite without de-alumination.

The toluene contained in the tail gas after the adsorption process was detected to be 5.3 mg/m³, the adsorption efficiency was 97.4%, and the total selectivity of CO and $CO_2$ during the regeneration process was 71%.

After the whole process was repeated for three cycles and five cycles, the adsorption penetration was reduced by 49%, 78% respectively. Ozone and toluene emissions were detected in the tail gas during the regeneration process and the catalyst was significantly deactivated.

Comparative Example 2

Provided herein was a method for treating a VOCs-containing waste gas by using the system of Example 1, which was specifically described below.

(S1) A waste gas containing 100 mg/m³ of toluene was fed to the adsorption bed that is filled with 10 kg catalyst for adsorption with a gaseous hourly space velocity of 20000 $h^{-1}$.

(S2) After 15 h of the adsorption, the VOC monitor 9 detected 10 mg/m³ of toluene, and then the regeneration was performed, where the VOC monitor 9 was arranged at a position which is away from the outlet of the adsorption bed at a distance of ⅓ of a length of the adsorption bed.

(S3) The ozone generator 4 and the oxygen-ozone mixture feeding system 3 were switched on, and oxygen containing 30 g/m³ of ozone was fed to the waste gas through the one-way valve 5, where a measured flow rate was 1/11 of the flow rate of the waste gas.

(S4) The gas heating device 2 was switched on to increase the temperature of the waste gas to raise the adsorption bed to 80° C. under the monitoring of the temperature sensor 10.

(S5) When the concentration of $CO_2$ in the tail gas was basically stable (after 16 h), the ozone generator 4 and the oxygen-ozone mixture feeding system 3 were turned off, the one-way valve 5 was automatically closed, and the waste gas was always kept feeding.

(S6) The gas heating device 2 was turned off, and the adsorption bed was cooled to room temperature.

Steps (S1)-(S6) were repeated.

In this embodiment, the total selectivity of CO and $CO_2$ was measured to be 98%. The total feeding time of ozone was 16 hours, 2.6 times longer than that in Example 1 (370 min).

The steps (S1)-(S6) were repeated for ten cycles, and the adsorption penetration was reduced by 3%.

Comparative Example 3

Provided herein was a method for treating a VOCs-containing waste gas by using the system of Example 1, which was specifically described below.

(S1) A waste gas containing 100 mg/m³ of toluene was fed to the adsorption bed that is filled with 10 kg catalyst for adsorption with a gaseous hourly space velocity of 20000 $h^{-1}$. After the adsorption, a tail gas contained 2 mg/m³ of toluene.

(S2) After 5 h of the adsorption, the VOC monitor 9 detected 10 mg/m$^3$ of toluene, and then the regeneration was performed, where the VOC monitor 9 was arranged at a position which is away from the outlet of the adsorption bed at a distance of ⅓ of a length of the adsorption bed.

(S3) The ozone generator 4 and the oxygen-ozone mixture feeding system 3 were switched on, and oxygen containing 30 g/m$^3$ of ozone was fed to the waste gas through the one-way valve 5, where a measured flow rate was 1/11 of the flow rate of the waste gas.

(S4) The gas heating device 2 was switched on to increase the temperature of the waste gas to heat the adsorption bed to 30° C. under the monitoring of the temperature sensor 10.

(S5) When the concentration of $CO_2$ in the tail gas was basically stable (after 8 h), the ozone generator 4 and the oxygen-ozone mixture feeding system 3 were turned off, the one-way valve 5 was automatically closed, and the waste gas was always kept feeding.

(S6) The gas heating device 2 was turned off, and the adsorption bed was cooled to room temperature.

Steps (S1)-(S6) were repeated.

In this embodiment, the total selectivity of CO and $CO_2$ was measured to be 70%.

The steps (S1)-(S6) were repeated for five cycles, and the adsorption penetration was reduced by 42%.

Comparative Example 4

Provided herein was a method for treating a VOCs-containing waste gas by using the system of Example 1, which was specifically described below.

(S1) A waste gas containing 100 mg/m$^3$ of toluene was fed to the adsorption bed that is filled with 10 kg catalyst for adsorption with a gaseous hourly space velocity of 20000 h$^{-1}$.

(S2) After 11 h of the adsorption, the VOC monitor 9 detected 10 mg/m$^3$ of toluene, and then the low-temperature regeneration was performed, where the VOC monitor 9 was arranged at a position which is away from the outlet of the adsorption bed at a distance of ⅓ of a length of the adsorption bed.

(S3) The ozone generator 4 and the oxygen-ozone mixture feeding system 3 were switched on, and oxygen containing 30 g/m$^3$ of ozone was fed to the waste gas through the one-way valve 5, where a measured flow rate was 1/11 of the flow rate of the waste gas. The catalytic process was performed at 25° C., and the temperature was monitored by the temperature sensor.

(S4) After 5 min of the low-temperature regeneration, the ozone concentration was detected to be 1 mg/m$^3$ by the ozone monitor 12 arranged near an outlet of the adsorption bed, and then the high-temperature regeneration was performed.

(S5) The gas heating device 2 was switched on to increase the temperature of the waste gas to heat the adsorption bed to 80° C. under the monitoring of the temperature sensor 10.

(S6) When the concentration of $CO_2$ in the tail gas was basically stable (after 20 h), the ozone generator 4 and the oxygen-ozone mixture feeding system 3 were turned off, the one-way valve 5 was automatically closed, and the waste gas was always kept feeding.

(S7) The gas heating device 2 was turned off, and the adsorption bed was cooled to room temperature.

Steps (S1)-(S7) were repeated.

The catalyst used in herein was prepared with reference to the Example 3 in Chinese patent application No. 202011621185.X, where the addition amount of manganese acetate was reduced such that the mass fraction of manganese in the de-aluminized Y zeolite carrier was 0.1%.

In this embodiment, the content of each substance in the tail gas was measured in real time by using an autosampler and gas chromatography detection system during use, and The total selectivity of CO and $CO_2$ was measured to be 91%. Toluene in the tail gas was maintained at the emission standard.

Due to insufficient active sites, the ozone was penetrated quickly and could not be fully consumed during the low-temperature regeneration.

In the high-temperature regeneration process, the desorbed toluene could not be degraded in time due to the increase in temperature and insufficient active sites, and desorbed toluene was detected in the tail gas with a maximum concentration of 50 mg/m$^3$.

During the high-temperature regeneration process, the ozone did not react completely, and the ozone was detected in the tail gas with a maximum concentration in of 14.2 g/m$^3$.

The steps (S1)-(S7) were repeated for five cycles, and the adsorption penetration was reduced by 11%.

Comparative Example 5

Provided herein was a method for treating a VOCs-containing waste gas by using the system of Example 1, which was specifically described below.

(S1) A waste gas containing 100 mg/m$^3$ of toluene was fed to the adsorption bed that is filled with 10 kg catalyst for adsorption with a gaseous hourly space velocity of 20000 h$^{-1}$.

(S2) After 21 h of the adsorption, the VOC monitor 9 detected 10 mg/m$^3$ of toluene, and then the low-temperature regeneration was performed, where the VOC monitor 9 was arranged at a position which is away from the outlet of the adsorption bed at a distance of ⅓ of a length of the adsorption bed.

(S3) The ozone generator 4 and the oxygen-ozone mixture feeding system 3 were switched on, and oxygen containing 30 g/m$^3$ of ozone was fed to the waste gas through the one-way valve 5, where a measured flow rate was 1/11 of the flow rate of the waste gas. The catalytic process was performed at 28° C., and the temperature was monitored by the temperature sensor.

(S4) After 11 h of the low-temperature regeneration, the ozone concentration was detected to be 1 mg/m$^3$ by the ozone monitor 12 arranged near an outlet of the adsorption bed, and then the high-temperature regeneration was performed.

(S5) The gas heating device 2 was switched on to increase the temperature of the waste gas to heat the adsorption bed to 80° C. under the monitoring of the temperature sensor 10.

(S6) When the concentration of $CO_2$ in the tail gas was basically stable (after 3 h), the ozone generator 4 and the oxygen-ozone mixture feeding system 3 were turned off, the one-way valve 5 was automatically closed, and the waste gas was always kept feeding.

(S7) The gas heating device 2 was turned off, and the adsorption bed was cooled to room temperature.

Steps (S1)-(S7) were repeated.

The catalyst used in herein was prepared with reference to the Example 3 in Chinese patent application No. 202011621185.X, where the addition amount of manganese acetate was increased such that the mass fraction of manganese in the de-aluminized Y zeolite carrier was 20%.

The toluene in the tail gas after the adsorption was detected to be 1 mg/m$^3$, and the adsorption efficiency reached 99%.

The total selectivity of CO and $CO_2$ was measured to be 94%.

The duration of the low-temperature regeneration process was longer compared with Example 1, as some of the ozone underwent autolysis, while the total adsorption volume was increased.

The duration of the high-temperature regeneration process was also longer compared with Example 1, as a large amount of ozone underwent autolysis due to the high temperature and high metal content conditions.

The steps (S1)-(S7) were repeated for ten cycles, and the adsorption penetration was reduced by 3%.

In this example, the amount of manganese oxides was more than that in Example 1, but the effects were not improved and the ozone consumption was increased.

In this application, the removal rate of low-concentration VOCs in the waste gas was more than 95%, the ozone consumption was much lower than the general ozone catalytic process, and the average concentration of the ozone in the tail gas was below 0.2 mg/m$^3$, which met the emission standards.

In summary, this application adopts a low-metal content catalyst with high VOC adsorption capacity and desirable catalytic activity for ozonation to achieve the single adsorption bed treatment of continuous flow waste gases containing low-concentration VOCs without replacing the adsorbent, reducing the energy and material consumption and avoiding the secondary pollution.

What is claimed is:

1. A method for treating a volatile organic compounds (VOCs)—containing waste gas, comprising;
   (S1) feeding the VOCs-containing waste gas to an adsorption bed for enrichment;
   (S2) when a VOC monitor arranged near an outlet of the adsorption bed detects VOCs, continuously feeding the VOCs-containing waste gas to the adsorption bed; and performing a primary in-situ regeneration; and
   (S3) when an ozone monitor arranged near an outlet of the adsorption bed detects ozone, performing a secondary in-situ regeneration; and
   (S4) repeating steps (S1)-(S3) to complete treatment of the VOCs-containing waste gas;
   wherein the primary in-situ regeneration is performed through a step of:
   (a) turning on an ozone generator; and feeding ozone-containing oxygen to the adsorption bed to be mixed with the VOCs-containing waste gas for simultaneous adsorption and catalytic ozonation;
   the secondary in-situ regeneration is performed through steps of:
   (A) turning on a gas heating device to heat the VOCs-containing waste gas, so as to heat the adsorption bed to 70-90° C.;
   (B) after a concentration of $CO_2$ in a tail gas is stable, turning off the ozone generator;
   (C) turning off the gas heating device to allow the adsorption bed to be cooled.

2. The method of claim 1, wherein in the primary in-situ regeneration, a temperature of the adsorption bed is controlled to be 20-50° C.

3. The method of claim 1, wherein a concentration of VOCs in the VOCs-containing waste gas is lower than 500 mg/m$^3$.

4. The method of claim 1, wherein a gaseous hourly space velocity of the adsorption bed is 10000-200000 h$^{-1}$.

5. The method of claim 1, wherein in step (S2), when a VOC concentration detected by the VOC monitor is larger than or equal to 10% of an initial VOC concentration in the VOCs-containing waste gas, the waste gas is continuously fed to the adsorption bed, and the primary in-situ regeneration is performed.

6. The method of claim 1, wherein in step (a), an ozone concentration at an outlet of the ozone generator is 4000-35000 mg/m$^3$; and a volume ratio of the ozone-containing oxygen to the VOCs-containing waste gas is 1:(10-50).

7. The method of claim 1, wherein the VOC monitor and the ozone monitor are arranged at a position which is away from the outlet of the adsorption bed at a distance of ⅕-⅓ of a length of the adsorption bed.

8. The method of claim 1, wherein in step (S3), when an ozone concentration detected by the ozone monitor is larger than or equal to 1 mg/m$^3$, the secondary in-situ regeneration is performed.

9. The method of claim 1, wherein in step (B), when a concentration change of $CO_2$ is less than 10% within 3-10 min, the concentration of $CO_2$ in the tail gas is considered to be stable.

10. The method of claim 1, wherein the adsorption bed is filled with a catalyst; the catalyst comprises an inorganic ceramic matrix and a molecular sieve coating; the molecular sieve coating is loaded on the inorganic ceramic matrix; the inorganic ceramic matrix has a specific surface area of 5-150 m$^2$/g; the molecular sieve coating has a specific surface area of 300-800 m$^2$/g; a silicon-to-aluminum ratio of the molecular sieve coating is not less than 3; the molecular sieve coating is loaded with a metal oxide; the metal oxide is up to 10% by weight of the molecular sieve coating; and the molecular sieve coating and the inorganic ceramic matrix are both coated with colloidal silica.

11. A system for implementing the method of claim 1, comprising:
   an adsorption bed;
   wherein an inlet of the adsorption bed is provided with a first gas distribution support layer; an outlet of the adsorption bed is provided with a second gas distribution support layer; a filler is arranged between the first gas distribution support layer and the second gas distribution support layer; an oxygen-ozone mixture feeding system is arranged between an inlet of an adsorption tower and the first gas distribution support layer; and a temperature sensor, a temperature control device, a VOC monitor, and an ozone monitor are provided near the outlet of the adsorption bed.

* * * * *